(12) United States Patent
Hoffman

(10) Patent No.: US 7,167,539 B1
(45) Date of Patent: Jan. 23, 2007

(54) THERMAL SENSING DETECTOR CELL FOR A COMPUTED TOMOGRAPHY SYSTEM AND METHOD OF MANUFACTURING SAME

(75) Inventor: David M. Hoffman, New Berlin, WI (US)

(73) Assignee: General Electric Company, Schenectady, NY (US)

( * ) Notice: Subject to any disclaimer, the term of this patent is extended or adjusted under 35 U.S.C. 154(b) by 702 days.

(21) Appl. No.: 10/604,589

(22) Filed: Aug. 1, 2003

Related U.S. Application Data

(62) Division of application No. 09/683,869, filed on Feb. 25, 2002, now Pat. No. 6,654,443.

(51) Int. Cl.
*A61B 6/00* (2006.01)

(52) U.S. Cl. ...................................................... 378/19
(58) Field of Classification Search ............... 378/4, 378/19; 250/336.1, 339.01, 339.02, 370.08, 250/370.09
See application file for complete search history.

(56) References Cited

U.S. PATENT DOCUMENTS

| | | | |
|---|---|---|---|
| 5,585,638 A | 12/1996 | Hoffman | |
| 5,799,057 A | 8/1998 | Hoffman et al. | |
| 5,845,003 A | 12/1998 | Hu et al. | |
| 6,087,665 A | 7/2000 | Hoffman et al. | |
| 6,115,448 A | 9/2000 | Hoffman | |
| 6,134,301 A | 10/2000 | Mruzek et al. | |
| 6,137,857 A | 10/2000 | Hoffman et al. | |
| 6,144,718 A | 11/2000 | Hoffman et al. | |
| 6,173,031 B1 | 1/2001 | Hoffman et al. | |
| 6,198,791 B1 | 3/2001 | He et al. | |
| 6,263,046 B1 | 7/2001 | Rogers | |
| 6,344,649 B2 | 2/2002 | Riedner et al. | |
| 6,904,304 B2 * | 6/2005 | Hoffman | 600/407 |
| 7,084,404 B2 * | 8/2006 | Hoffman et al. | 250/363.02 |
| 2002/0087073 A1 * | 7/2002 | Hoffman | 600/425 |
| 2002/0123683 A1 * | 9/2002 | Hoffman | 600/425 |
| 2002/0131626 A1 | 9/2002 | Vogtmeier et al. | |

\* cited by examiner

*Primary Examiner*—Eric S. McCall
(74) *Attorney, Agent, or Firm*—Ziolkowski Patent Solutions Group, SC; Michael A. Della Penna; Carl B. Horton

(57) ABSTRACT

The present invention provides a method of manufacturing a CT detector cell having an x-ray absorption component and a thermal sensing component. The thermal sensing component is configured to detect thermal differentials in the absorption component resulting from the absorption of x-rays.

20 Claims, 4 Drawing Sheets

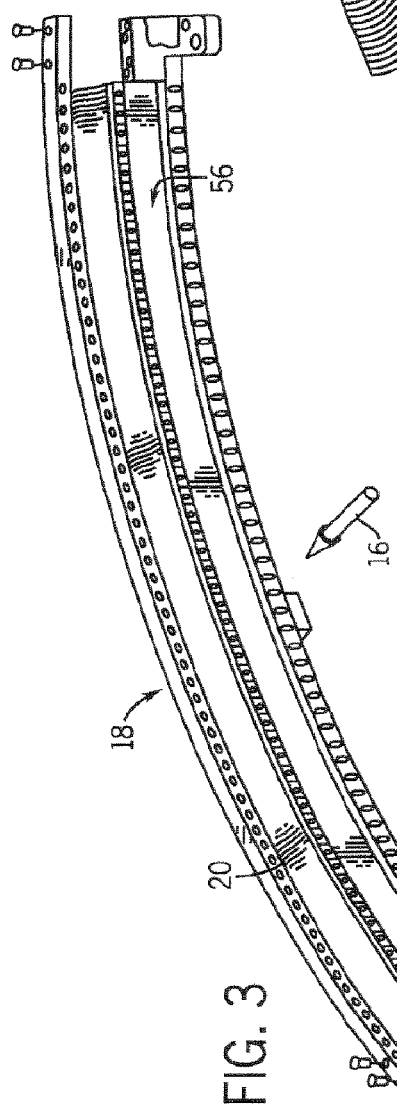
FIG. 3
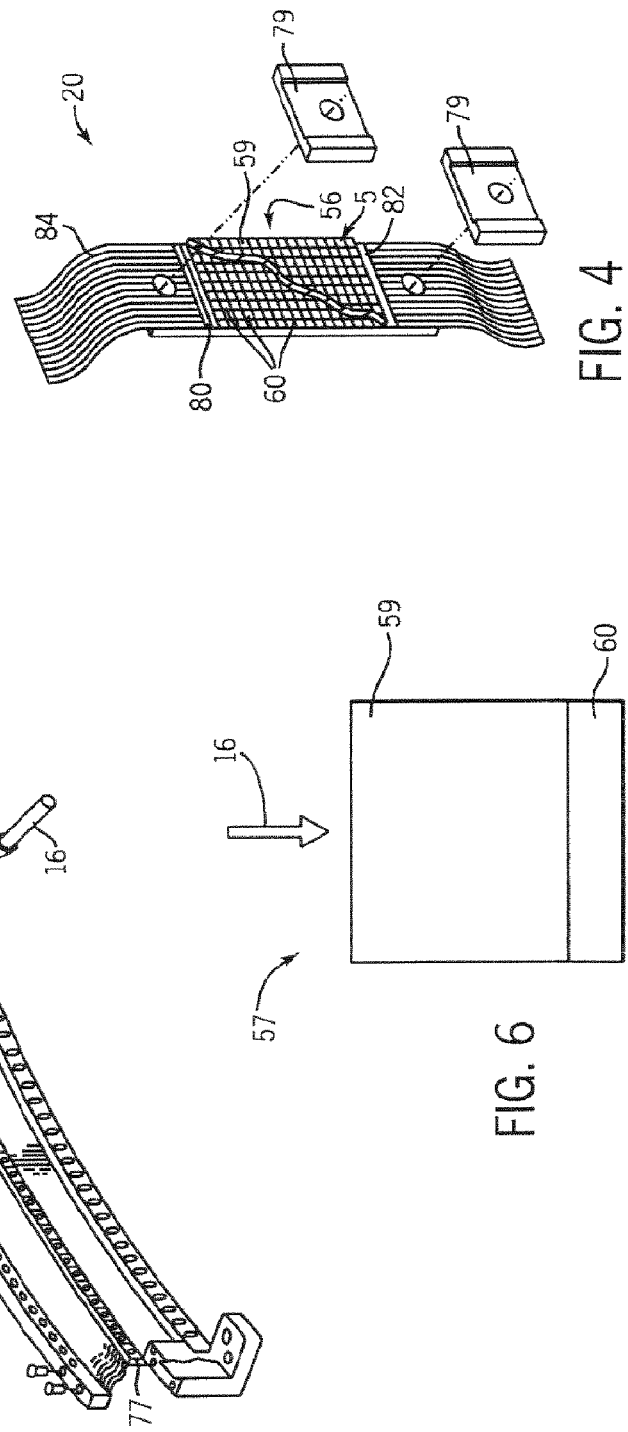
FIG. 4
FIG. 6

THERMAL SENSING DETECTOR CELL FOR A COMPUTED TOMOGRAPHY SYSTEM AND METHOD OF MANUFACTURING SAME

CROSS REFERENCE TO RELATED APPLICATIONS

The present application is a divisional and claims priority of U.S. Ser. No. 09/683,869 filed Feb. 25, 2002 now U.S. Pat. No. 6,654,443.

BACKGROUND OF INVENTION

The present invention relates generally to computed tomography imaging and, more particularly, to a detector cell for sensing thermal changes in response to the absorption of HF electromagnetic energy for use with computed tomography systems.

Typically, in computed tomography (CT) imaging systems, an x-ray source emits a fan-shaped beam towards a subject or object, such as a patient or a piece of luggage. Hereinafter the terms "subject" and "object" shall include anything capable of being imaged. The beam, after being attenuated by the subject, impinges upon an array of radiation detectors. The intensity of the attenuated beam radiation received at the detector array is typically dependent upon the attenuation of the x-ray beam by the subject. Each detector element of the detector array produces a separate electrical signal indicative of the attenuated beam received by each detector element. The electrical signals are transmitted to a data processing system for analysis which ultimately results in the formation of an image.

Generally, the x-ray source and the detector array are rotated about the gantry within an imaging plane and around the subject. X-ray sources typically include x-ray tubes, which emit the x-ray beam at a focal point. X-ray detectors typically include a collimator for collimating x-ray beams received at the detector, a scintillator for converting x-rays to light energy adjacent the collimator, and photodiodes for receiving the light energy from the adjacent scintillator. Each scintillator of a scintillator array converts x-rays to light energy. Each scintillator discharges light energy to a photodiode adjacent thereto. Each photodiode detects the light energy and generates a corresponding electrical signal. The outputs of the photodiodes are then transmitted to a data processing system.

With these known scintillators, the scintillating component must be of sufficient thickness to generate the requisite efficient x-ray detection. As a result, a minimum scintillating material thickness is necessary for proper signal to noise generation by the photodiode. The minimum requirements yield higher costs as well as limit the ability to reduce the overall detector cell size and spatial resolution of the detector. Furthermore, detection inefficiencies in this two step detection process, x-rays to light and light to electrical signals, has efficiency losses resulting in a diagnostic image of poorer quality or lower sensitivity.

High density materials may be advantageously used in a detection cell as these materials may absorb HF electromagnetic energy in relatively thin cross-sections. As a result, smaller detector cells can be fabricated increasing system resolution. Moreover, use of materials that change in temperature upon the absorption of HF electromagnetic energy allows for use of thermal sensing components rather than photodiodes thereby producing output signals more indicative of the HF electromagnetic energy detected resulting in a more sensitive and a diagnostic image of greater sensitivity.

It would therefore be desirable to design a detector cell for sensing thermal differentials in the detector cell resulting from the absorption of HF electromagnetic energy thereby providing improved, higher resolution, and more sensitive detector signal output to a data processing system of a CT system.

BRIEF DESCRIPTION OF INVENTION

The present invention is directed to a detector cell overcoming the aforementioned drawbacks that generates electrical signals indicative of HF electromagnetic energy absorbed by the detector as defined by thermal differentials within the detector.

In accordance with one aspect of the present invention, a method of manufacturing a radiation detector sensor array for use with CT systems includes the step of determining a high density material capable of changing in temperature upon absorption of radiation. The method further includes forming an absorption array having a plurality of absorption cells from the high density material. The method also includes coupling a thermal sensing array having a plurality of thermal sensing cells to the absorption array such that each thermal sensing cell corresponds to an absorption cell.

According to another aspect of the present invention, a CT detector array manufacturing process includes the step of shaping a bulk of high density material into a block as well as the step of pixilating the block to form a plurality of x-ray absorption component cells. The manufacturing process further includes the step of affixing a plurality of thermal sensing cells formed in an array to the plurality of x-ray absorption component cells.

In accordance with yet another aspect of the present invention, a method of CT detector manufacture includes the steps of forming a sheet of x-ray absorption material and etching the sheet such that a pixilated array of absorption components is formed. The method further includes the step of coupling an array of thermal sensing components to the array of absorption components.

Various other features, subjects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings:

FIG. 3 is a is a perspective view of one embodiment of a CT system detector array.

FIG. 4 is a is a perspective view of one embodiment of a detector.

FIG. 6 is a cross-sectional view of one embodiment of the present invention.

DETAILED DESCRIPTION

The operating environment of the present invention is described with respect to a four-slice computed tomography (CT) system. However, it will be appreciated by those skilled in the art of CT that the present invention is equally applicable for use with single-slice or other multi-slice configurations. Moreover, the present invention will be described with respect to the detection and conversion of x-rays. However, one skilled in the art will further appreciate that the present invention is equally applicable for the detection and conversion of other HF electromagnetic energy. Further, the present invention will be described with respect to a "third generation" CT system. However, the present invention is also applicable with first, second, and fourth generation CT systems.

Figure 1:
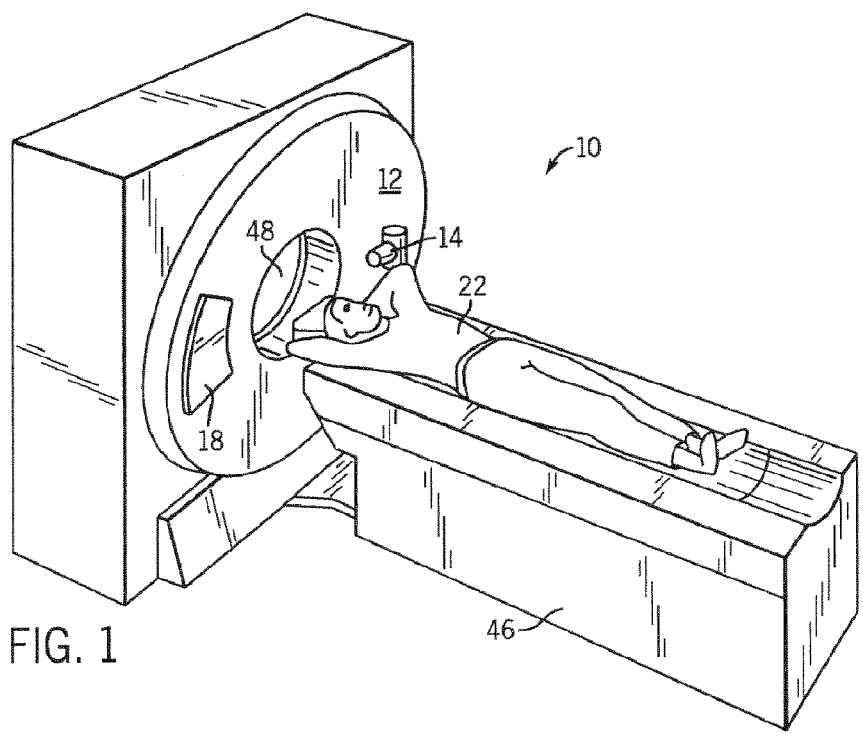
FIG. 1 is a pictorial view of a CT imaging system.
Figure 2:
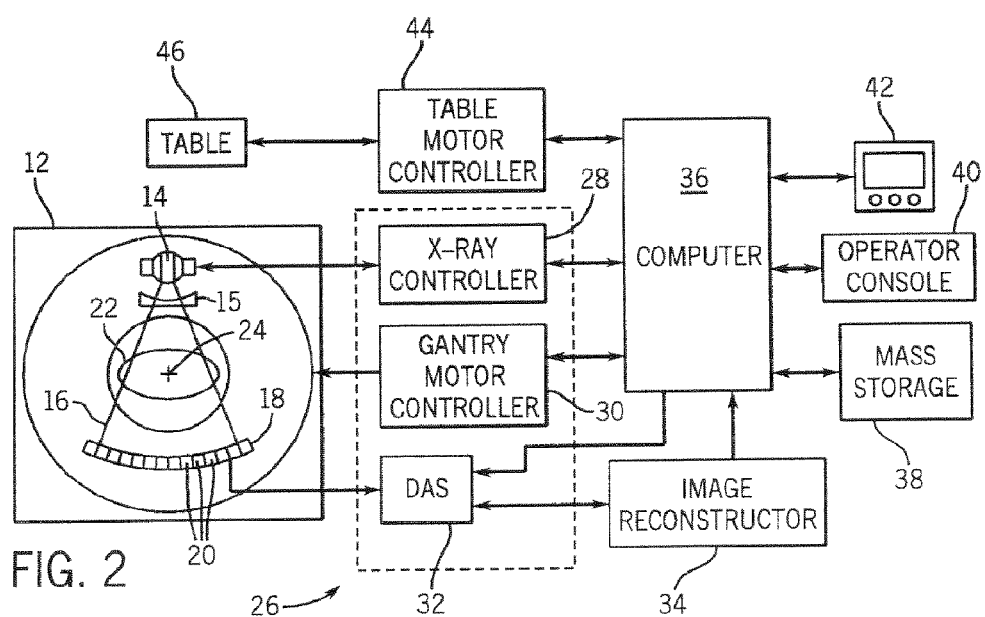
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of radiation or x-rays 16 toward a detector array 18 on the opposite side of the gantry 12. Detector array 18 is formed by a plurality of detectors 20 which together sense the projected x-rays that pass through a medical patient 22. Each detector 20 produces an electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. A data acquisition system (DAS) 32 in control mechanism 26 samples analog data from detectors 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard or a like data entry module. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves portions of patient 22 through a gantry opening 48.

As shown in FIGS. 3 and 4, detector array 18 includes a plurality of detectors 20. A collimator 15, as shown in FIG. 2, is positioned to collimate x-ray beams 16 before such beams impinge upon detector array 18.

In one embodiment, shown in FIG. 3, detector array 18 includes 57 pixilated detectors 20, each detector 20 having a plurality of detector cells 57 arranged in an array 56 with a size of 16×16. As a result, array 18 has 16 rows and 912 columns (16×57 detectors) which allows 16 simultaneous slices of data to be collected with each rotation of gantry 12. As will be described with particular reference to FIG. 6, each detector cell 57 includes an x-ray absorption component 59 and a thermal sensing component 60 that, in a preferred embodiment, is affixed to an undersurface of absorption component 59. Array 56 may have a pixilated orientation or, alternatively, a columnar orientation.

Switch arrays 80 and 82, FIG. 4, include multi-dimensional semiconductor arrays coupled between detector array 18 and DAS 32. Switch arrays 80 and 82 further include a plurality of field effect transistors (FET) (not shown) arranged as a multi-dimensional array. The FET array includes a number of electrical leads connected to each of the respective detector cells 57 and a number of output leads electrically connected to DAS 32 via a flexible electrical interface 84. Particularly, about one-half of detector cell outputs are electrically connected to switch 80 with the other one-half of detector cell outputs electrically connected to switch 82. Each detector 20 is secured to a detector frame 77, FIG. 3, by mounting brackets 79.

Switch arrays 80 and 82 further include a decoder (not shown) that enables, disables, or combines detector cell 57 outputs in accordance with a desired number of slices and slice resolutions for each slice. Decoder, in one embodiment, is a decoder chip or an FET controller as known in the art. Decoder includes a plurality of output and control lines coupled to switch arrays 80 and 82 and DAS 32. In one embodiment defined as a 16 slice mode, decoder enables switch arrays 80 and 82 so that all rows of the detector array 18 are activated, resulting in 16 simultaneous slices of data for processing by DAS 32. Of course, many other slice combinations are possible. For example, decoder may also select from other slice modes, including one, two, and four-slice modes.

Figure 5:
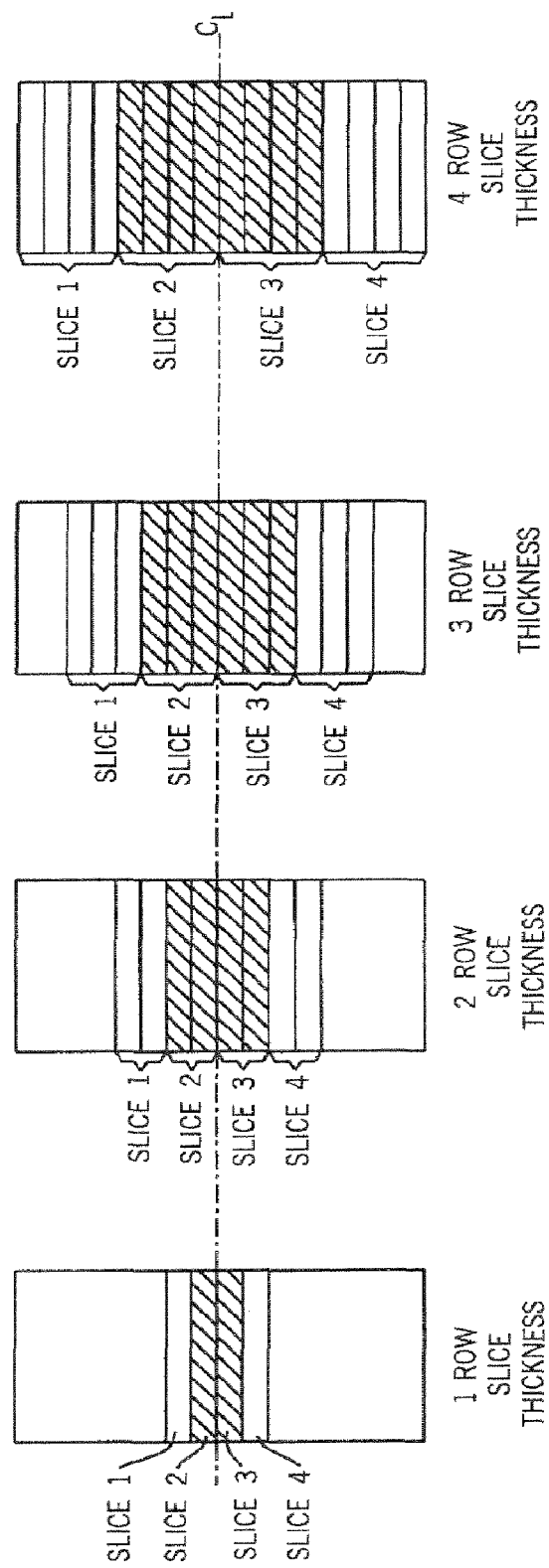
FIG. 5 is a is illustrative of various configurations of the detector in FIG. 4 in a four-slice mode.

As shown in FIG. 5, by transmitting the appropriate decoder instructions, switch arrays 80 and 82 can be configured in the four-slice mode so that the data is collected from four slices of one or more rows of detector array 18. Depending upon the specific configuration of switch arrays 80 and 82, various combinations of detector cells 20 can be enabled, disabled, or combined so that the slice thickness may consist of one, two, three, or four rows of detector cells 20. Additional examples include, a single slice mode including one slice with slices ranging from 1.25 mm thick to 20 mm thick, and a two-slice mode including two slices with slices ranging from 1.25 mm thick to 10 mm thick. Additional modes beyond those described are contemplated.

Referring now to FIG. 6, a cross-sectional view of a single detector cell 57 is shown. As indicated previously, each detector cell 57 includes an x-ray absorption component 59 as well as a thermal sensing component 60. Absorption component 59 is positioned to detect x-rays 16 or other HF electromagnetic energy waves passing through the subject to be scanned, such as, a medical patient as illustrated in FIG. 1. Preferably, absorption component 59 comprises a high density material that may absorb x-rays in a relatively thin cross-section. Such high density materials may include tungsten, lead, tantalum, or the like. Further, the high density materials should also have a "high z" characteristic or high atomic number. Furthermore, as will be discussed below, the materials used for the absorption component should also have low heat or thermal capacity resulting in significant temperature change in response to x-ray absorption.

The high density, high z materials used to form the absorption component 59 undergo detectable temperature change upon the absorption of x-rays or other HF electromagnetic energy. Several methods may be used to construct an array of absorption components including fabricating a sheet of the selected material and then etching or laser cutting the sheet into pixilated structures. Alternatively, absorption component 59 may also be formed by depositing the absorption materials in collimator structures, or in pixilated structures, or may also be sputtered or vapor deposited and then etched or laser cut. Masking operations may also be utilized to form an array of absorption components.

Still referring to FIG. 6, coupled to absorption component 59 is a thermal sensing component 60. Thermal sensing component 60 is configured to detect thermal differentials of absorption component 59 resulting from the absorption of x-rays 16. The temperature change of the materials detected is proportional to the number and energy of the x-rays absorbed by component 59. Component 60 detects the thermal change and outputs an electrical signal indicative of the absorbed x-rays. The present invention contemplates several thermal sensing component embodiments including a night vision infrared thermal sensor, a room temperature microbolometer, and other sensitive thermal measuring instrumentation. It should be noted that the temperature change per CT view is an incremental temperature change with each view or increment in time. Therefore, the temperature difference of the detector from view to view must be calculated as a measure of the x-ray intensity absorbed during that particular view.

The present invention may be incorporated into a CT medical imaging device similar to that shown in FIG. 1. Alternatively, however, the present invention may also be incorporated into a non-invasive package or baggage inspection system, such as those used by postal inspection and airport security systems.

Figure 7:
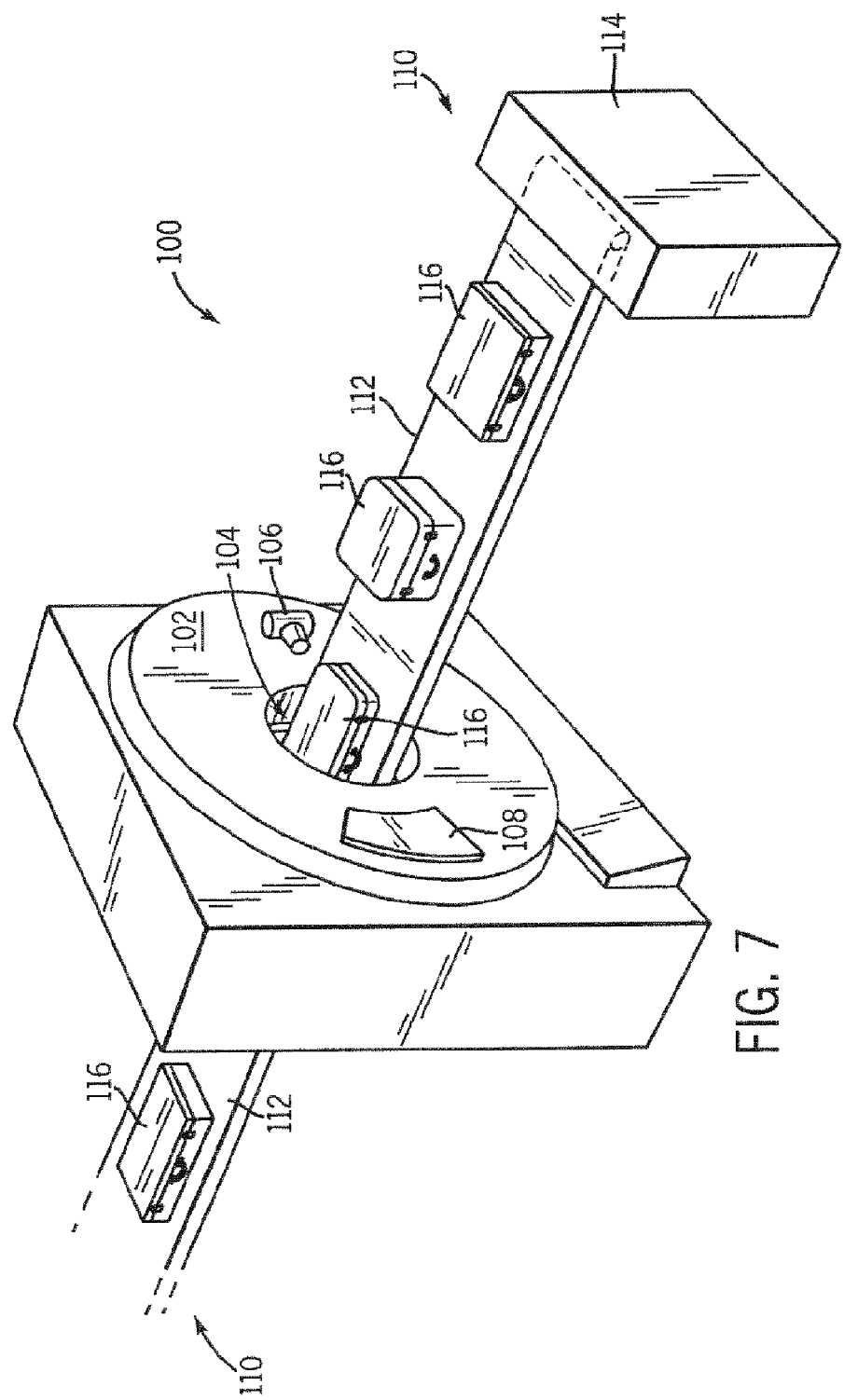
FIG. 7 is a pictorial view of a CT system for use with a non-invasive package/luggage inspection system.

Referring now to FIG. 7, package/baggage inspection system 100 includes a rotatable gantry 102 having an opening 104 therein through which packages or pieces of baggage may pass. The rotatable gantry 102 houses a HF electromagnetic energy source 106 as well as a detector assembly 108 having detector arrays comprised of detectors similar to that shown in FIGS. 4 and 6. A conveyor system 110 is also provided and includes a conveyor belt 112 supported by structure 114 to automatically and continuously pass packages or baggage pieces 116 through opening 104 to be scanned. Subjects 116 are fed through opening 104 by conveyor belt 112, imaging data is then acquired, and the conveyor belt 112 removes the packages 116 from opening 104 in a controlled and continuous manner. As a result, postal inspectors, baggage handlers, and other security personnel may non-invasively inspect the contents of packages 116 for explosives, knives, guns, contraband, etc.

As indicated previously, the present invention contemplates several methods to fabricate a detector cell as described above. In one preferred embodiment, a thin sheet of absorption component materials is fabricated and immersed in a chemical etchant. After the sheet undergoes immersion for a specific time, the sheet is transferred to a rinse station that assists in removing acid located on the sheet surface. Once the acid is removed, the sheet is rinsed and dried. The chemical etchant facilitates anti-strophic etching of unprotected portions of the sheet which aids in the formation of absorption component.

In another preferred embodiment, plasma is applied to the sheet to facilitate the forming of absorption component. To form component, the sheet is loaded into a chamber wherein pressure is reduced by a vacuum system. After the vacuum is established, the chamber is filled with a reactive gas and a frequency field is created through electrodes in the chamber with the aid of a power supply. The frequency field energizes the gas mixture to a plasma state. In the energized state, the gas mixture attacks unprotected portions of the sheet, and converts the sheet into volatile components which are subsequently removed by the vacuum system. When the volatile components are removed, an array of absorption components is formed within the sheet.

In a further embodiment, an array of absorption components may be fabricated using ion beam milling techniques.

In accordance with one embodiment of the present invention, a method of manufacturing a radiation detector sensor array for use with CT systems includes the step of determining a high density material capable of changing in temperature upon absorption of radiation. The method further includes forming an absorption array having a plurality of absorption cells from the high density material. The method also includes coupling a thermal sensing array having a plurality of thermal sensing cells to the absorption array such that each thermal sensing cell corresponds to an absorption cell.

According to another embodiment of the present invention, a CT detector array manufacturing process includes the step of shaping a bulk of high density material into a block as well as the step of pixilating the block to form a plurality of x-ray absorption component cells. The manufacturing process further includes the step of affixing a plurality of thermal sensing cells formed in an array to the plurality of x-ray absorption component cells.

In accordance with yet another embodiment of the present invention, a method of CT detector manufacture includes the steps of forming a sheet of x-ray absorption material and etching the sheet such that a pixilated array of absorption components is formed. The method further includes the step of coupling an array of thermal sensing components to the array of absorption components.

The present invention has been described in terms of the preferred embodiment, and it is recognized that equivalents, alternatives, and modifications, aside from those expressly stated, are possible and within the scope of the appending claims.

The invention claimed is:

1. A method of manufacturing an x-ray detector sensor array for use with CT systems, the method comprising the steps of:
   determining a high density material capable of changing in temperature upon absorption of radiation;
   forming an absorption array having a plurality of absorption cells from the high density material; and
   coupling a thermal sensing array having a plurality of thermal sensing cells to the absorption array.

2. The method of claim 1 wherein the step of forming an absorption array includes the step of forming a sheet of the high density material.

3. The method of claim 2 further comprising the step of etching the sheet to form a pixilated absorption array having a plurality of pixilated absorption cells.

4. The method of claim 2 further comprising the step of laser-cutting the sheet to form a pixilated absorption array having a plurality of pixilated absorption cells.

5. The method of claim 1 wherein the step of forming an absorption array includes the step of columnating the high density material.

6. The method of claim 1 wherein the step of forming an absorption array includes the steps of sputtering the high density material; and one of:
   etching the high density material;
   laser-cutting the high density material; and
   masking the high density material.

7. A CT detector array manufacturing process comprising the steps of:
- shaping a bulk of high density material into a block;
- pixilating the block to form a plurality of x-ray absorption component cells; and
- affixing a plurality of thermal sensing cells formed in an array to the plurality of x-ray absorption component cells.

8. The process of claim 7 wherein the step of pixilating includes the step of laser cutting the block along one dimension so as to form the plurality of x-ray absorption component cells.

9. The process of claim 8 further comprising the step of laser cutting the block along another dimension perpendicular to the one dimension.

10. The process of claim 7 wherein the high density material is configured to experience detectable thermal changes upon reception of x-rays.

11. The process of claim 10 wherein the high density material is further configured to experience thermal changes proportionally to the amount of x-rays received.

12. The process of claim 11 wherein the plurality of thermal sensing cells is configured to detect thermal changes in the plurality of x-ray absorption component cells.

13. The process of claim 7 wherein the block is formed of lead and the plurality of thermal sensing cells is further configured to output electrical signals indicative of x-ray absorption by the plurality of x-ray absorption component cells.

14. A method of CT detector manufacture, the method comprising the steps of:
- forming a sheet of x-ray absorption material;
- etching the sheet such that an array of absorption components is formed; and
- coupling an array of thermal sensing components to the array of absorption components.

15. The method of claim 14 wherein the step of etching includes laser cutting the sheet along two dimensions.

16. The method of claim 14 wherein the step of etching includes ion beam milling the sheet to form the array of absorption components.

17. The method of claim 14 wherein the step of etching includes:
- applying a mask to the sheet;
- submersing the sheet in a chemical etchant;
- removing the sheet from the chemical etchant; and
- allowing the etchant to dry.

18. The method of claim 14 wherein the step of etching includes:
- applying a layer of plasma to the sheet;
- loading the sheet in a vacuum chamber;
- creating a vacuum in the chamber;
- filling the chamber with a reactive gas;
- creating a frequency field in the chamber;
- energizing the layer of plasma to an energized state;
- allowing the energized plasma to convert unprotected portions of the sheet to a number of volatile components; and
- removing the volatile components with a vacuum.

19. The method of claim 14 wherein the x-ray absorption material includes lead.

20. The method of claim 14 wherein the array of thermal sensing components is configured to detect temperature changes in the array of x-ray absorption components.

* * * * *

UNITED STATES PATENT AND TRADEMARK OFFICE
CERTIFICATE OF CORRECTION

PATENT NO. : 7,167,539 B1
APPLICATION NO. : 10/604589
DATED : January 23, 2007
INVENTOR(S) : Hoffman It is certified that error appears in the above-identified patent and that said Letters Patent is hereby corrected as shown below:

On the cover page,

[*] Notice: Subject to any disclaimer, the term of this patent is extended or adjusted under 35 USC 154(b) by (702) days Delete the phrase "by 702 days" and insert -- by 745 days --

Signed and Sealed this

Twenty-ninth Day of April, 2008

JON W. DUDAS
*Director of the United States Patent and Trademark Office*